(12) United States Patent
Loomis, III et al.

(10) Patent No.: US 11,341,472 B2
(45) Date of Patent: May 24, 2022

(54) SECURE PAYMENTS WITH UNTRUSTED DEVICES

(71) Applicant: Maxim Integrated Products, Inc., San Jose, CA (US)

(72) Inventors: Donald Wood Loomis, III, Coppell, TX (US); Edward Tangkwai Ma, Plano, TX (US); Robert Michael Muchsel, Addison, TX (US)

(73) Assignee: Maxim Integrated Products, Inc., San Jose, CA (US)

(*) Notice: Subject to any disclaimer, the term of this patent is extended or adjusted under 35 U.S.C. 154(b) by 164 days.

(21) Appl. No.: 15/850,258

(22) Filed: Dec. 21, 2017

(65) Prior Publication Data

US 2018/0114210 A1 Apr. 26, 2018

Related U.S. Application Data

(62) Division of application No. 13/535,969, filed on Jun. 28, 2012, now Pat. No. 9,858,560.

(51) Int. Cl.
*G06Q 20/00* (2012.01)
*G06Q 20/20* (2012.01)
(Continued)

(52) U.S. Cl.
CPC .......... *G06Q 20/20* (2013.01); *G06Q 20/322* (2013.01); *G06Q 20/3278* (2013.01); *G06Q 20/40* (2013.01)

(58) Field of Classification Search
CPC ... G06Q 20/20; G06Q 20/322; G06Q 20/3278
(Continued)

(56) References Cited

U.S. PATENT DOCUMENTS 7,600,676 B1 * 10/2009 Rados .................... G06Q 20/40
235/380
9,607,292 B1 * 3/2017 Kawan .................... G06Q 20/02
(Continued)

FOREIGN PATENT DOCUMENTS

CN 1859100 A 11/2006
CN 1882963 A 12/2006
(Continued)

OTHER PUBLICATIONS

Tiwari, Ayu et al., A Multi-Factor Security Protocol For Wireless Payment-Secure Web Authentication Using Mobile Devices, IADIS, ISBN 978-972-8924-30-0, 8 pages, 2007 (Attached) (Year: 2007).*
(Continued)

*Primary Examiner* — Rokib Masud
(74) *Attorney, Agent, or Firm* — North Weber & Baugh LLP; Michael North

(57) ABSTRACT

Various embodiments of the present invention relate to a point-of-sale (POS) system, and more particularly, to systems, devices and methods of making secure payments using a mobile device in addition to a POS terminal that may be an insecure payment device exposed to various tamper attempts under certain circumstances. The mobile device is involved in a trusted transaction between a central financial entity, e.g., a bank, and the payment terminal, such that the insecure payment terminal may be further authenticated based on rolling codes, two-way or three-way authentication, or an off-line mode enabled by incorporation of the mobile device. Although either of the mobile device and the payment terminal provides limited security, a POS system incorporating both of them demonstrates an enhanced level of security.

7 Claims, 7 Drawing Sheets

(51) Int. Cl.
*G06Q 20/32* (2012.01)
*G06Q 20/40* (2012.01)

(58) Field of Classification Search
USPC .................................................. 705/16, 18
See application file for complete search history.

(56) References Cited

U.S. PATENT DOCUMENTS

| | | | |
|---|---|---|---|
| 2004/0203354 A1* | 10/2004 | Yue | H04W 12/069 |
| | | | 455/41.1 |
| 2006/0158310 A1 | 7/2006 | Klatsmanyi et al. | |
| 2009/0049301 A1 | 2/2009 | Hamid et al. | |
| 2011/0247063 A1* | 10/2011 | Aabye | G06Q 20/3829 |
| | | | 726/6 |
| 2012/0290415 A1* | 11/2012 | Itwaru | G06Q 20/306 |
| | | | 705/16 |

FOREIGN PATENT DOCUMENTS

| | | |
|---|---|---|
| CN | 101060401 A | 10/2007 |
| CN | 101473344 A | 7/2009 |
| CN | 101615314 A | 12/2009 |
| CN | 101645192 A | 2/2010 |
| WO | 2005001670 A2 | 1/2005 |
| WO | 2010065056 A1 | 6/2010 |

OTHER PUBLICATIONS

Tiwari, Ayu et al., A Multi-Factor Security Protocol For Wireless Payment-Secure Web Authentication Using Mobile Devices, IADIS, ISBN 978-972-8924-30-0, 8 pages, 2007 (Attached).*
Office Action dated Apr. 18, 2019, in Chinese Patent Application No. 201310261664.9 (11 pgs).
Response filed Jun. 27, 2019, in Chinese Patent Application No. 201310261664.9 (13pgs).
Office Action dated Dec. 4, 2019, in Chinese Patent Application No. 201310261664.9, filed Jun. 27, 2013 (11pgs).
Office Action, and English translation thereof, dated Apr. 24, 2018, in Chinese Patent Application No. 201310261664.9 (11 pgs).
Office Action dated Oct. 24, 2018, in Chinese Patent Application No. 201310261664.9 (11 pgs).
Response filed Jan. 7, 2019, in Chinese Patent Application No. 201310261664.9 (13pgs).
Tiwari, Ayu et al., "A Multi-Factor Security Protocol for Wireless Payment-Secure Web Authentication Using Mobile Devices," IADIS, ISBN 978-972-8924-30-0, 2007 (8pgs).
First Office Action dated Jul. 5, 2017, and English translation thereof, in Chinese Patent Application No. 201310261664.9, filed Jun. 27, 2013 (18pgs).
Response filed Nov. 20, 2017, and English translation of amended claims, in Chinese Patent Application No. 201310261664.9, filed Jun. 27, 2013 (18pgs).
Chinese office action dated Nov. 25, 2021 in related Chinese patent application No. 201310261664.9, (22 pgs).
Chinese office action response filed Jan. 10, 2022 in related Chinese patent application No. 201310261664.9, (22 pgs).
Chinese office action dated Mar. 7, 2022 in related Chinese patent application No. 201310261664.9, (14 pgs).
Chinese office action recommended response to office action in related Chinese patent application No. 201310261664.9, (3 pgs).

* cited by examiner

200

400

450

SECURE PAYMENTS WITH UNTRUSTED DEVICES

CROSS-REFERENCE TO RELATED APPLICATIONS

This application is a divisional and claims priority to previously filed, copending U.S. patent application Ser. No. 13/535,969, listing Donald Wood Loomis III, Edward Tangkwai Ma, and Robert Michael Muchsel, as inventors, entitled, "SECURE PAYMENTS WITH UNTRUSTED DEVICES," and filed Jun. 28, 2012, which application is hereby incorporated herein by reference in its entirety.

BACKGROUND

A. Technical Field

The present invention relates to a point-of-sale (POS) system, and more particularly, to systems, devices and methods of making secure payments using a mobile device in addition to a POS terminal that may be an insecure payment device exposed to various tamper attempts under certain circumstances. The mobile device is involved in a trusted transaction between a central financial entity, e.g., a bank, and the payment terminal, such that the insecure payment terminal may be further authenticated based on rolling codes, two-way or three-way authentication, or an off-line mode enabled by incorporation of the mobile device.

B. Background of the Invention

A point of sale (POS), also referred to as point of purchase or checkout, is the location where transactions of purchase and payment occur. At each POS terminal, appropriate hardware and software are used to manage a selling process by a salesperson, and allows creation and printing of purchase receipts. FIGURE (hereinafter, "FIG.") 1 illustrates a conventional POS system 100 that relies on communication between a payment terminal 102 and a central financial entity, e.g., a bank 104. The bank 104 issues a payment token 106 to a user. The payment terminal 102 reads the payment token 106 to extract account information which is further communicated to the bank 104. The bank 104 requests a signature or personal identification number (PIN) from the user, and authorizes a payment upon user authentication. Examples of the payment token 106 include a credit card issued by a credit card company, a debit card associated with a bank account, and a prepaid cash card, and the payment token 106 may be read by swiping through or touching the payment terminal 102.

The user has to carry a physical debit or credit card which is embedded with a magnetic strip or chip. The magnetic strip or chip is used to store the customer's personal account information. In most debit or credit cards, authentication of a cardholder is still limited to the cardholder's signature, a password and/or a short PIN, such that minimum efforts are required from the cardholder and the technical barrier may be significantly reduced for average people. Despite convenience for use, credit cards are faced with tremendous security threats. Once a thief steals a card, he or she may conveniently fake the signature, or decipher the password or PIN that sometimes includes only four digits.

Furthermore, once the payment terminal 102 is compromised, an adversary may capture a personal data, while the payment token is read by the payment terminal 102 during a trusted transaction. When the user enters his personal data, e.g., account information, signature, password and PIN, into a conventional POS terminal, he or she is supposed to trust the device based on its brand name and mandatory device security certification. However, in many places over the world, this trust is not guaranteed. The payment terminal 102 may be tampered with, and a counterfeit terminal may have been installed to replace the legitimate payment terminal 102. The counterfeit terminal easily captures the confidential personal data when the payment token is processed at the terminal, and the data may be used by a thief to make unauthorized purchases and payments, or alter the amount charged to the payment token. Therefore, a conventional payment terminal may only be regarded as an untrusted device that sustains a limited security level for processing trusted transactions.

SUMMARY OF THE INVENTION

Various embodiments of the present invention relate to a point-of-sale (POS) system, and more particularly, to systems, devices and methods of making secure payments using a mobile device in addition to a POS terminal that may be an insecure payment device exposed to various tamper attempts under certain circumstances. The mobile device is involved in a trusted transaction between a central financial entity, e.g., a bank, and the payment terminal, such that the insecure payment terminal may be further authenticated based on rolling codes, two-way or three-way authentication, or an off-line mode enabled by incorporation of the mobile device.

One aspect of the invention is a method of authenticating a user and a trusted transaction in a payment terminal, and in this method, a financial entity, e.g., a bank, functions as a hub to communicate with the mobile device and the payment terminal separately. A payment token is used at the payment terminal to initialize the trusted transaction, and a corresponding payment request is placed and communicated to the financial entity. The financial entity issues a verification data by the financial entity to the mobile device. A response is communicated to the financial entity according to the verification data, and the financial entity authenticates the user and the trusted transaction according to the response.

One aspect of the invention is a three-way authentication method that involves coupling between every two of a mobile device, a financial entity and a payment terminal. Personalities are exchanged between the mobile device and the payment terminal to unlock further functionality. A payment token is used at the payment terminal to initialize the trusted transaction, and a corresponding payment request is placed and communicated to a financial entity. The financial entity communicates with the mobile device for confirmation. Another verification data is inputted at the payment terminal, such that the financial entity may authenticate the user and the trusted transaction.

Another aspect of the invention is an off-line method to authenticate a user and a trusted transaction using a payment terminal and a mobile device. The mobile device and the payment terminal are coupled via a communication link. Personalities are exchanged between the mobile device and the payment terminal to unlock further functionality. A payment token is used at the payment terminal to initialize the trusted transaction, and a corresponding payment request is placed and communicated to the mobile device. As a result, the user is prompted to approve the payment request.

Certain features and advantages of the present invention have been generally described in this summary section;

however, additional features, advantages, and embodiments are presented herein or will be apparent to one of ordinary skill in the art in view of the drawings, specification, and claims hereof. Accordingly, it should be understood that the scope of the invention shall not be limited by the particular embodiments disclosed in this summary section.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE PREFERRED EMBODIMENTS

Figure 1:
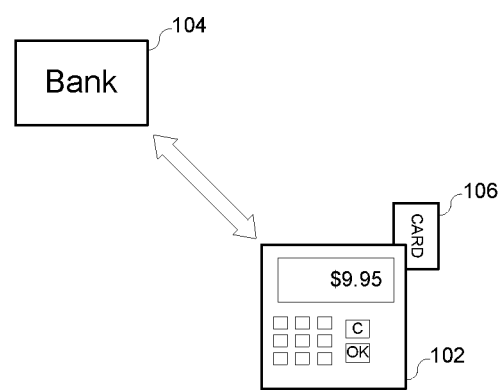
FIG. 1 illustrates a conventional POS system that relies on communication between a payment terminal and a central financial entity, e.g., a bank.

In the following description, for the purpose of explanation, specific details are set forth in order to provide an understanding of the invention. It will be apparent, however, to one skilled in the art that the invention can be practiced without these details. One skilled in the art will recognize that embodiments of the present invention, described below, may be performed in a variety of ways and using a variety of means. Those skilled in the art will also recognize additional modifications, applications, and embodiments are within the scope thereof, as are additional fields in which the invention may provide utility. Accordingly, the embodiments described below are illustrative of specific embodiments of the invention and are meant to avoid obscuring the invention.

Reference in the specification to "one embodiment" or "an embodiment" means that a particular feature, structure, characteristic, or function described in connection with the embodiment is included in at least one embodiment of the invention. The appearance of the phrase "in one embodiment," "in an embodiment," or the like in various places in the specification are not necessarily all referring to the same embodiment.

Furthermore, connections between components or between method steps in the figures are not restricted to connections that are effected directly. Instead, connections illustrated in the figures between components or method steps may be modified or otherwise changed through the addition thereto of intermediary components or method steps, without departing from the teachings of the present invention.

Various embodiments of the present invention relate to a point-of-sale (POS) terminal, and more particularly, to systems, devices and methods of making secure payments using the POS terminal and another mobile device that are both insecure devices exposed to various tamper attempts. A trusted transaction between a central financial entity, e.g., a bank, and the terminal involves the mobile device, such that the insecure terminal is further authenticated based on rolling codes, two-way authentication or three-way authentication.

Mobile devices have recently been applied in financial transactions, although they were initially introduced as communication terminals to receive and make phone calls via a radio link. A conventional mobile device is conveniently configured to a secure POS terminal by a software financial application. The financial application is installed on the mobile device upon a request by the user, and normally each bank or retailer may support its own application that has a verification interface. A username and a password for each bank or retailer may be directly inputted by the user through the keyboard or touch screen of the mobile device at an interface provided by the software application. Upon user authentication, trusted transactions are implemented via the financial application between the bank and the mobile devices.

However, payment on mobile devices is under the risk of being tampered by rogue software applications. Each mobile device is open for other applications irrelevant to any financial transactions, and these irrelevant applications may be used by a hacker to intercept the personal data inputted to the financial application Like the payment terminal, the mobile device that is configured by the financial application for mobile banking is also an untrusted device that only offers a limited security level for processing trusted transactions.

Herein, the mobile device is incorporated into a POS system that is originally based on a payment terminal. If the payment terminal and the mobile device have a respective probability of tampering as $Pr(T_M)$ and $Pr(T_P)$ that are independent of each other, the overall probability of tampering is largely reduced to the product, i.e., $Pr(T_M) \times Pr(T_P)$ for the POS system. In practical terms, the product is associated with a significantly low probability of tampering for the POS system that integrates both the payment terminal and the mobile device.

Figure 2A:
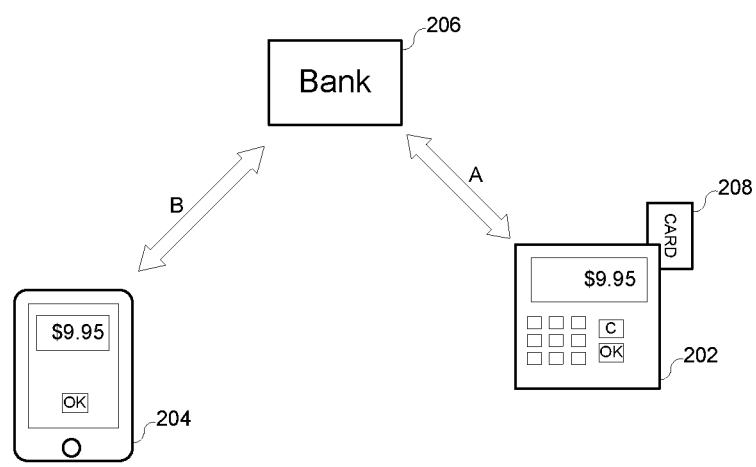
FIG. 2A illustrates an exemplary block diagram for a POS system that incorporates both a payment terminal and a mobile device according to various embodiments in the invention.

FIG. 2A illustrates an exemplary block diagram 200 for a POS system that incorporates both a payment terminal 202 and a mobile device 204 according to various embodiments in the invention. The mobile device 204 communicates with a central financial entity, e.g., a bank 206, and is involved in a trusted transaction that a user makes a payment request to the bank 206 via the payment terminal 202. The bank 206 communicates with the payment terminal 202 to exchange information about a user, a user account and the trusted transaction (link A), while additional information may also be communicated between the bank 206 and the mobile device 204 (link B). The additional information includes, but is not limited to, a PIN, a transaction code, a security question, a confirmation notice and any information inputted by the user. The user controls both the mobile device 208 and a payment token, e.g., a credit card 208, which is used to hold account information. In various embodiments of the present invention, the mobile device 208 may be owned by the user, borrowed from another user, loaned or leased from a service provider.

The payment terminal 202, coupled to the mobile device 204, provides an enhanced security level that use of a single payment terminal may not offer. In a conventional payment terminal, authentication is based on a PIN or signature. The PIN is constant for all trusted transactions, while the signature may not be verified on real-time. Theft of the PIN or signature is a big concern. Due to the quantities of installed payment terminals, it is unrealistic to expect wholesale changes in a short amount of time. However, use of the mobile device 204 enables many alternative security measures to overcome this challenge. In one embodiment, the mobile device 204 enables a rolling-code scheme, such that the bank may instantaneously vary the PIN or issue a verification transaction code for each trusted transaction. In another embodiment, the mobile device 204 allows two-way authentication in which the bank 206 issues a security question or a confirmation notice to the mobile device 204 for each individual trusted transaction. Hence, the mobile device 204 and the payment terminal 202 are coupled to authenticate the user and the payment at an enhanced security level.

Figure 2B:
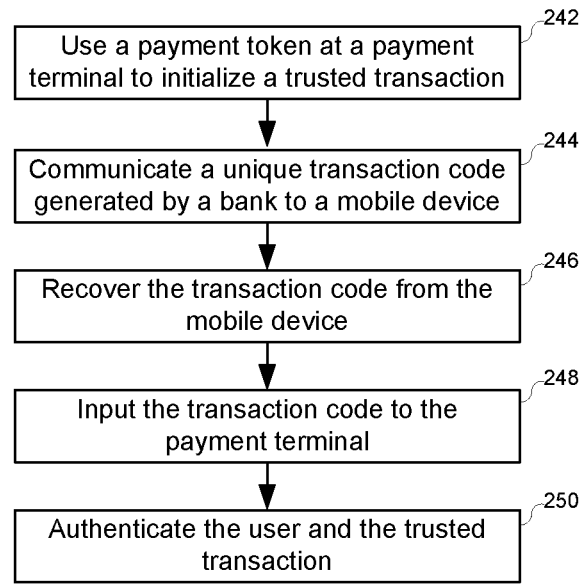
FIG. 2B illustrates an exemplary method based on a rolling-code scheme according to various embodiments of the invention.

FIG. 2B illustrates an exemplary method 240 based on a rolling-code scheme according to various embodiments of the invention. In this rolling-code scheme, the bank 206 communicates a verification transaction code, i.e., a rolling code, to the mobile device 204 for each individual trusted transaction. At step 242, a payment token, e.g., a credit card 208, is processed by the payment terminal 202 to initialize a trusted transaction for payment. A request for payment is made at the terminal 202 and further communicated to the bank 206. While requesting a transaction code to be inputted from the payment terminal 204, the bank 206 generates the verification transaction code on real-time, and transfers it to the mobile device 204 at step 244. At step 246, this transaction code may be recovered in an email or an instant message at the mobile device 204. In response to the request sent by the bank 206, the real-time transaction code has to be inputted to the payment terminal 202 by the user at step 248, such that both the user and the transaction may be authenticated by the bank at step 250. In various embodiments, this transaction code may replace a conventional PIN inputted at the payment terminal 202, or be applied in addition to the PIN to allow an enhanced security level for the POS system 200.

Figure 2C:
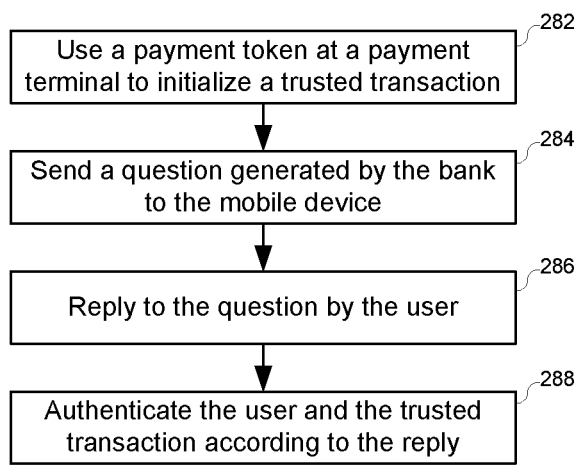
FIG. 2C illustrates an exemplary method for two-way authentication according to various embodiments in the invention.

FIG. 2C illustrates an exemplary method 280 for two-way authentication according to various embodiments in the invention. In two-way authentication, the user has to respond to a security question or a confirmation notice issued by the bank 206 to the mobile device 204, such that the user and a corresponding trusted transaction may be authenticated. At step 282, a payment token, e.g., a credit card 208, is processed by the payment terminal 202 to initialize a trusted transaction for payment. A request for payment is made at the terminal 202 and further communicated to the bank 206. At step 284, the bank 206 generates a question, and sends it to the mobile device 204. In various embodiments of the invention, this question may be a security question or a confirmation notice that is sent in an email or an instant message. At step 286, the user has to reply to the question. In one embodiment, the reply has to be made within a time limit, and conform to a specific format. Upon receiving a satisfactory response, the bank 206 authenticates the user and the transaction at step 288.

In certain embodiments of above two-way authentication, the bank 206 may issue two separate messages respectively to the payment terminal 202 and the mobile device 204. The messages may take exemplary forms of pictures, words and musical clips, and particularly, these two messages are identical or match with each other. As a result, at step 286, the user has to confirm whether these two messages are identical or match with each other as intended.

One of those skilled in the art sees that both the rolling code scheme 240 and the two-way authentication method 280 may be implemented by the POS system 200. The rolling codes, security questions or messages are different forms of a verification data that the bank 206 issues to the mobile device 204 for the purpose of user and transaction authentication. In response to the verification data, the user may optionally respond by inputting the rolling code at the payment terminal 202, answering the security questions or confirming messages at the mobile device 204. This response is ultimately communicated back to the bank 206, waiting to be authenticated. Furthermore, in various embodiments of the invention, the bank is merely an example of a financial entity where the user holds credits for spending. The financial entity may also be a credit card company or a clearing house.

Figure 3A:
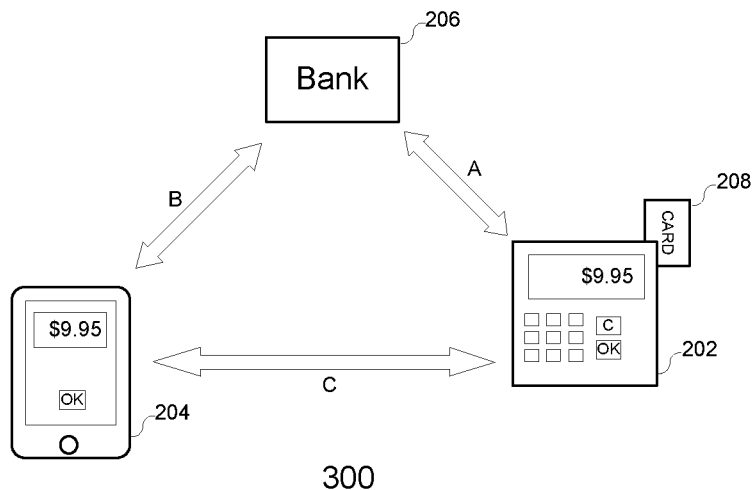
FIG. 3A illustrates another exemplary block diagram for a POS system that incorporates both a payment terminal and a mobile device according to various embodiments in the invention.

FIG. 3A illustrates another exemplary block diagram 300 for a POS system that incorporates both a payment terminal 202 and a mobile device 204 according to various embodiments in the invention. In the POS system 200, the bank 206 functions as a hub that maintains two relatively independent communication channels, i.e., links A and B, to the payment terminal 202 and the mobile device 204, respectively. Herein, direct communication (link C) between the payment terminal 202 and the mobile device 204 is also established, such that a method for three-way authentication may be sustained in this POS system 300.

Figure 3B:
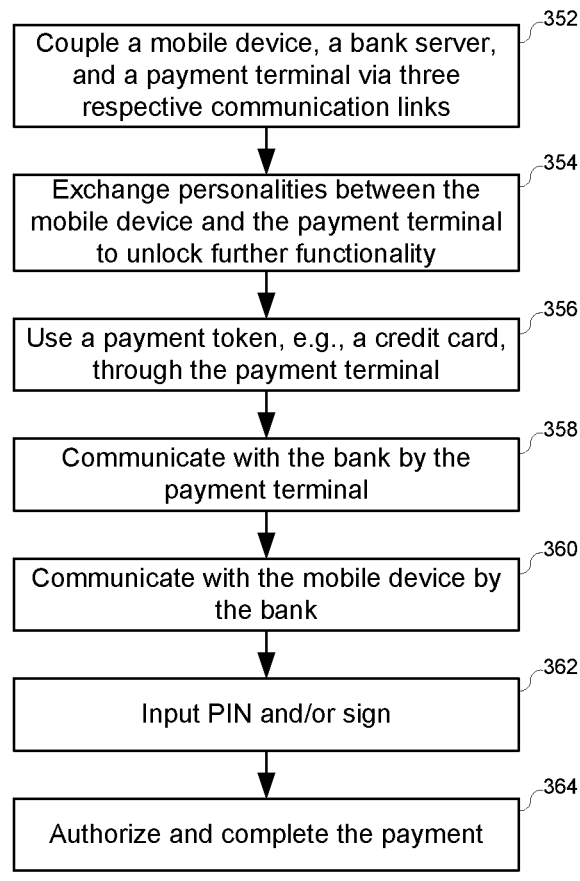
FIG. 3B illustrates an exemplary method for three-way authentication among the bank, the payment terminal and the mobile device according to various embodiments of the invention.

FIG. 3B illustrates an exemplary method 350 for three-way authentication among the bank 206, the payment terminal 202 and the mobile device 204 according to various embodiments of the invention. At step 352, every two entities among the bank 206, the payment terminal 202 and the mobile device 204 are coupled via a respective communication link. The payment terminal 202 is commonly coupled to the bank 206 via an internet based on a wired or wireless local area network (LAN). The mobile device 204 communicates with the bank 206 based on a cellular network that the device 204 is registered with. Direct mobile-to-payment communication between the mobile device 204 and the payment terminal 202 may be based on a short-range radio, optical or infrared link, and particularly, near-field communication (NFC), a Wi-Fi network or a Bluetooth network are all applicable to establish the link. Nevertheless, information involves sensitive data, such as account information and security questions, and thus, have to be communicated in an encrypted format among the above three entities. The encrypted format is compatible with a type of the respective communication link among them.

At step 354, personalities are exchanged via the direct mobile-to-payment communication (link C) between the mobile device 204 and the payment terminal 202. One example of the personalities is a digital certificate. If the personalities match a preapproved list, further functionality is unlocked between the mobile device and the payment terminal 202, and the user is prompted to proceed with payment by both the mobile device 204 and the payment terminal 202.

At step 356, a payment token, e.g., a credit card 208, is processed by the payment terminal 202 to initialize a particular trusted transaction for payment. A request for payment is made at the terminal 202 and further communicated to the bank 206 via link A at step 358. The bank 206 further communicates with the mobile device 204 for confirmation via link B at step 360. Upon confirmation of the mobile device 204, the user is prompted to enter the PIN and/or sign at the payment terminal 202 at step 362.

Between steps 360 and 362, the mobile device 204 and the payment terminal 202 separately hold their confidential information, and avoid tampering attempts that originates from each other. As a confidential data for confirmation is sent to or entered at the mobile device 204, the data is not exposed to the payment terminal 202. Likewise, the mobile device 204 does not have access to the PIN or signature on the payment terminal 202, and rogue software applications installed on it cannot initialize a similar transaction either.

Figure 4A:
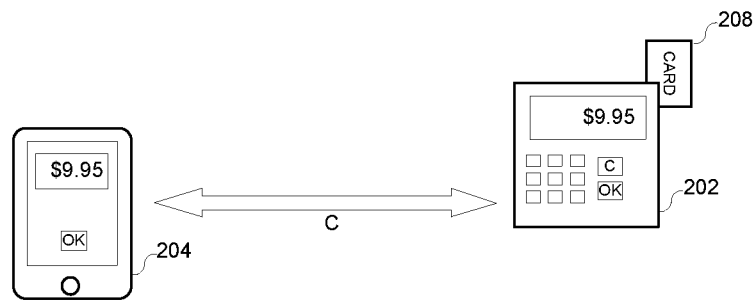
FIG. 4A illustrates an exemplary block diagram of an offline POS system that is based on a payment terminal and a mobile device according to various embodiments in the invention.

FIG. 4A illustrates an exemplary block diagram 400 of an offline POS system that is based on a payment terminal 202 and a mobile device 204 according to various embodiments in the invention. The POS systems 200 and 300 require network communication from the bank 206 to the payment terminal 202 and the mobile device 204 via links A and B, respectively. Although these communication links are normally available, network disruption still occurs time and then, and thus, communication links A and B are not always desirable for reasons of cost or speed. The offline POS system 400 may be regarded as a POS system 300 operating at an offline mode that is independent of communication links A and B. This offline mode is enabled for small transactions and cash transactions in which authorization from the bank 206 is not required. In the offline mode, the trusted transaction may be completed between the payment terminal 202 and the mobile device 204 via link C directly.

The mobile device 204 and the payment terminal 202 exchange not only information concerning the trusted transaction, but also information for user and transaction authentication across link C. The transaction information includes data and time, account balance, and transaction amount. Personalities, random number or sequence number is communicated for the purpose of authenticating the user and the trusted authentication. The mobile device 204 is granted with an authority to authenticate the user and the trusted transaction under certain circumstances, and particularly, when the amount of money involved in the transaction is under a certain limit.

Figure 4B:
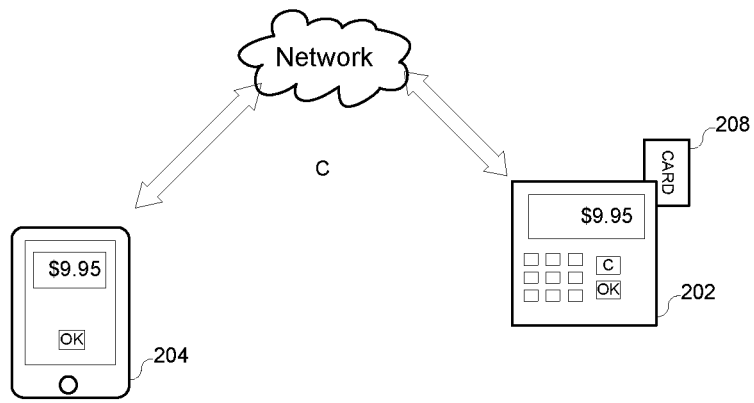
FIG. 4B illustrates an exemplary mobile-to-payment communication link (link C) in an offline POS system according to various embodiments of the invention.

FIG. 4B illustrates an exemplary mobile-to-payment communication link (link C) 420 in an offline POS system 400 according to various embodiments of the invention. As disclosed above, the mobile-to-payment communication link 420 is a direct short-range radio, optical or infrared link. However, link C may also be established via a general network infrastructure to maintain cost efficiency of the POS system 400.

Figure 5:
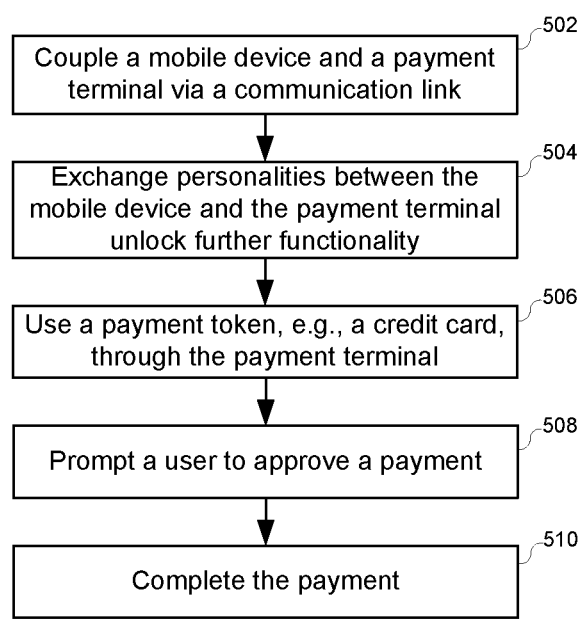
FIG. 5 illustrates an exemplary method for an off-line operation of a POS system according to various embodiments of the invention.

FIG. 5 illustrates an exemplary method 500 for a POS system 400 to operate at an off-line mode according to various embodiments of the invention. At step 502, the payment terminal 202 and the mobile device 204 are coupled via a mobile-to-payment communication link, i.e., link C. At step 504, personalities, such as a digital certificate, are exchanged via link C between the mobile device 204 and the payment terminal 202. If the personalities match a preapproved list, further functionality is unlocked between the mobile device 204 and the payment terminal 202, and the user is prompted to proceed with payment by both the mobile device 204 and the payment terminal 202.

At step 506, a payment token is 208 processed by the payment terminal 202 to initialize a particular trusted transaction for payment. A request for payment is made at the terminal 202 and further communicated to the mobile device 204 via link C. At step 508, the user is prompt to approve the payment at the interface of the mobile device 204. Thereafter, the payment is completed at step 510.

The mobile device 204 approves the payment according to a type of link C. In one embodiment, the payment terminal 202 emanates a radio or light beacon, and the mobile device 204 captures the beacon. To be specific, a verification identifier is encoded in low-cost pulsing light-emitting-diode (LED) illumination embedded in the payment terminal 202, and captured by the video camera that is integrated on the mobile device 204.

The verification identifier is used to authenticate the user and the trusted transaction. The verification identifier may contain a network address, a device identifier, a geographic location or other information that may be applied by the mobile device 204 to check the authenticity of the payment terminal 202. An association may be also created by this verification identifier between the payment terminal 202 and an encryption key to recover information communicated between the mobile device 204 and the payment terminal 202. Herein, additional network connection between the mobile device 204 and the payment terminal 202 is also established via a general network infrastructure, such as LAN and WLAN, and information may be exchanged via this additional network connection as well.

In another embodiment, a visible bar code or tag is properly used to prompt the trusted transaction in the offline POS system 400. A user may wave a bar code or tag in front of the payment terminal 202. The mobile device 204 may also scan/photograph the visible bar code or tag. Information for authentication and cryptography is extracted from the bar code or tag, just as it is extracted from the verification identifier in the previous embodiment.

Figure 6A:
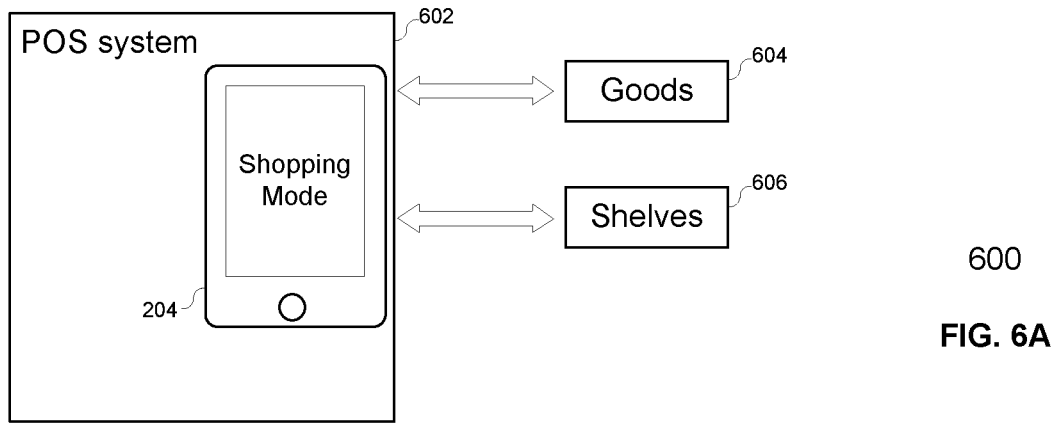
FIG. 6A illustrates an exemplary block diagram of a shopping system according to various embodiments in the invention.

FIG. 6A illustrates an exemplary block diagram 600 of a shopping system according to various embodiments in the invention. The mobile device 204 that communicates with the bank 206 is used to implement this shopping system 600. In this shopping system 600, payment terminals and cash registers are not needed. The mobile device 204 is set at a shopping mode. During the course of shopping, the mobile device 204 communicates with smart tags affixed to goods 604 or shelves 606. Product information is transmitted to the mobile device 204, awaiting the user to make a purchase decision. In one embodiment, the user may need to press an "add to purchase" button to purchase specific goods 604. In another embodiment, the phone is mounted on a docket embedded on a shopping cart, such that any goods placed into the shopping cart is automatically added to purchase. As one shopping is completed, the purchase is confirmed by the user on the mobile device 204, and payment is made automatically by the bank 206.

Although the shopping system 600 without the payment terminal 202 or cash registers is convenient, a security concern still exists for the mobile device 204 as an untrusted device that may be tampered by certain rogue software applications. In certain embodiments, the shopping system 600 may still require a complete POS system 602 to accept payment at the exit of a store. The store provides the payment terminal 202 coupled to the bank 206 and/or the mobile device 204. The POS system 602 may be optionally based on the rolling code scheme, two-way authentication, three-way authentication or the off-line mode to achieve a desirable security level.

Figure 6B:
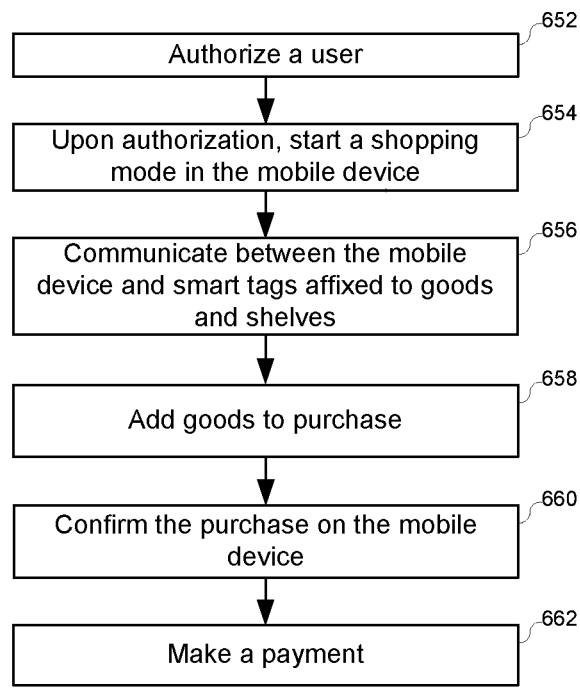
FIG. 6B illustrates an exemplary method for shopping with a mobile device according to various embodiments in the invention.

FIG. 6B illustrates an exemplary method 650 for shopping with a mobile device according to various embodiments in the invention. The user initializes a shopping mode on his mobile device at step 654, after the user first authenticates himself or herself with the mobile device at step 652. In various embodiments of the invention, user authentication is implemented by entering a PIN or verifying biometric information. During the course of shopping, the mobile device 202 reads information from smart tags affixed to the goods and shelves in the store at step 656. The goods placed in the shopping cart are added to purchase manually or automatically at step 658. Once shopping is completed, the purchase is completed on the mobile device 204 at the exit of the store at step 660. Once the user confirms the purchase, the mobile device 204 initializes to make a payment at step 662.

In certain embodiments, the payment is made to the store by the bank directly, when the mobile device 204 authorizes the bank 206 to make the payment. However, for payment at an enhanced security level, a payment terminal 202 at the store is involved to establish a POS system 200, 300 or 400; and to enable the rolling code scheme, two-way authentication, three-way authentication or the off-line mode among the bank 206, the payment terminal 202 and the mobile device 204.

While the invention is susceptible to various modifications and alternative forms, specific examples thereof have been shown in the drawings and are herein described in detail. It should be understood, however, that the invention is not to be limited to the particular forms disclosed, but to the contrary, the invention is to cover all modifications, equivalents, and alternatives falling within the scope of the appended claims.

We claim:

1. A method of three-way authentication of a user and a trusted transaction in a payment terminal, comprising the steps of:
    coupling every two of a mobile device, a financial entity and the payment terminal via a respective communication link;
    exchanging, via the respective communication link between the mobile device and the payment terminal, one or more personalities between the mobile device and the payment terminal, upon the one or more personalities matching a preapproved list, further functionality is unlocked between the mobile device and the payment terminal and the user is prompted to proceed with payment;
    using a payment token at the payment terminal to initialize the trusted transaction, a corresponding payment request being placed and communicated to the financial entity;
    communicating with the mobile device by the financial entity for confirmation;
    inputting a verification data at the payment terminal, such that the financial entity authenticates the user and the trusted transaction according to the verification data; and
    wherein both the mobile device and the payment token are controlled by the user.

2. The method according to claim 1, wherein a mobile-to-payment communication link is established between the payment terminal and the mobile device, and implemented as a link selected from a group consisting of a short-range radio link, an optical link and an infrared link.

3. The method according to claim 2, wherein the mobile-to-payment communication link is implemented based on one technology selected from near-field communication (NFC), Wi-Fi network and Bluetooth network.

4. The method according to claim 1, wherein the one or more personalities include a digital certificate.

5. The method according to claim 1, wherein further functionality is unlocked to allow payment by both the mobile device and the payment terminal.

6. The method according to claim 1, wherein the payment token is selected from a group consisting of a debit card, a credit card and a prepaid cash card.

7. The method according to claim 1, wherein the mobile device is used to read smart tags affixed to goods and shelves in a store, and check out the goods placed in a shopping cart.

* * * * *